US010819219B2

(12) United States Patent
Matsuda et al.

(10) Patent No.: US 10,819,219 B2
(45) Date of Patent: Oct. 27, 2020

(54) SEMICONDUCTOR DEVICE FOR SWITCHING POWER SUPPLY CONTROL AND AC-DC CONVERTER

(71) Applicants: Hiroki Matsuda, Zama (JP); Satoshi Arima, Isehara (JP)

(72) Inventors: Hiroki Matsuda, Zama (JP); Satoshi Arima, Isehara (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/660,738

(22) Filed: Oct. 22, 2019

(65) Prior Publication Data
US 2020/0127555 A1    Apr. 23, 2020

(30) Foreign Application Priority Data

Oct. 23, 2018 (JP) .................................. 2018-199394

(51) Int. Cl.
*H02M 1/32* (2007.01)
*H02M 1/36* (2007.01)
*H02M 3/335* (2006.01)

(52) U.S. Cl.
CPC ............... *H02M 1/32* (2013.01); *H02M 1/36* (2013.01); *H02M 3/33523* (2013.01); *H02M 2001/322* (2013.01)

(58) Field of Classification Search
CPC ...... H02M 1/32; H02M 1/36; H02M 3/33523; H02M 2001/322; H02M 3/33515; H02M 3/33507; H02M 3/325; H02M 7/21; H02M 7/217
See application file for complete search history.

(56) References Cited

U.S. PATENT DOCUMENTS

| 8,084,893 | B2 | 12/2011 | Fujii |
| 8,937,471 | B2 | 1/2015 | Kobayashi et al. |
| 10,284,071 | B2 | 5/2019 | Matsuda et al. |
| 2009/0268488 | A1 | 10/2009 | Fujii |
| 2012/0207505 | A1 | 8/2012 | Kobayashi et al. |

(Continued)

FOREIGN PATENT DOCUMENTS

| JP | 2012170289 A | 9/2012 |
| JP | 5343393 B2 | 8/2013 |
| JP | 2016158310 A | 9/2016 |

*Primary Examiner* — Adolf D Berhane
(74) *Attorney, Agent, or Firm* — Holtz, Holtz & Volek PC

(57) ABSTRACT

Disclosed is a semiconductor device for switching power supply control including: a high voltage input starting terminal; a discharger; and an input state detection circuit that includes: a voltage divider; a peak hold circuit; a first comparator which detects generation of a plug removal state; a second comparator which detects generation of a brownout state; a timer circuit; and a control signal generation circuit which generates a signal to turn on the discharger or a signal to stop outputting of a switching control signal, Td1, Td2 and Td3 are set to have a relationship of Td1<Td2<Td3, Td1 being a delay time until the capacitor is discharged, Td2 being a delay time for determining the plug removal state, and Td3 being a delay time for determining the brownout state, and at least the delay time Td2 and the delay time Td3 are measured by a common timer circuit.

7 Claims, 10 Drawing Sheets

(56) References Cited

U.S. PATENT DOCUMENTS

| | | | |
|---|---|---|---|
| 2013/0181635 A1* | 7/2013 | Ling | H05B 47/10 |
| | | | 315/297 |
| 2017/0365994 A1* | 12/2017 | Kikuchi | H02H 5/04 |
| 2018/0006569 A1* | 1/2018 | Kikuchi | H02M 3/33507 |
| 2018/0019656 A1 | 1/2018 | Matsuda et al. | |
| 2019/0334428 A1* | 10/2019 | Arima | H02M 1/32 |
| 2020/0112256 A1* | 4/2020 | Matsuda | H02M 3/33515 |
| 2020/0112264 A1* | 4/2020 | Arima | H02M 3/33592 |
| 2020/0127571 A1* | 4/2020 | Matsuda | H02M 1/36 |

* cited by examiner

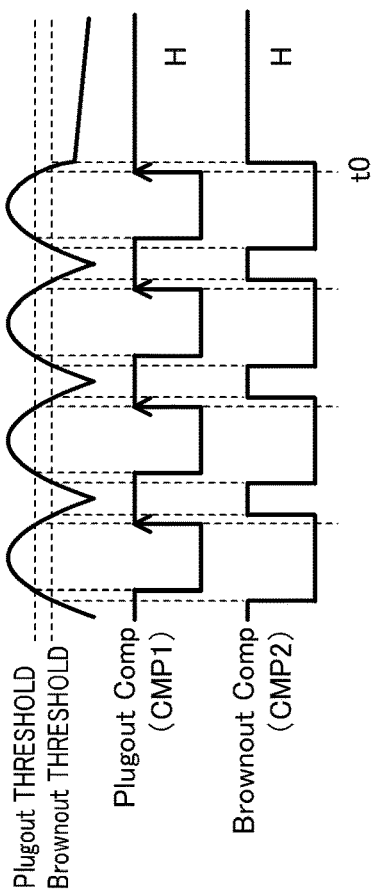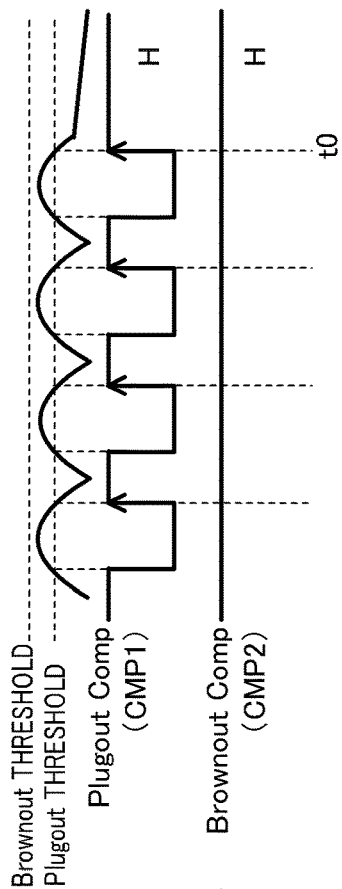

SEMICONDUCTOR DEVICE FOR SWITCHING POWER SUPPLY CONTROL AND AC-DC CONVERTER

CROSS-REFERENCE TO RELATED APPLICATION

This application is based upon and claims the benefit of priority from the prior Japanese Patent Application No. 2018-199394, filed on Oct. 23, 2018, the entire contents of which are incorporated herein by reference.

BACKGROUND

Technical Field

The present invention relates to a semiconductor device for power supply control, and particularly to a technique which is effectively used in a semiconductor device for primary-side control that is included in a switching power supply device provided with a transformer for voltage conversion, and in an AC-DC converter using the semiconductor device for primary-side control.

Background Art

Examples of a direct current power supply device include an isolated AC-DC converter of switching power supply control method which is configured by including a diode bridge circuit that rectifies an alternating current power supply, a DC-DC converter that reduces the direct current voltage rectified in the diode bridge circuit to convert the voltage into a direct current voltage of a desired electric potential, and the like.

In a general isolated AC-DC converter, an X capacitor is connected between AC terminals in order to attenuate the normal mode noise, and a resistor for discharging is connected in parallel with the X capacitor in order to rapidly discharge the electric charges remaining in the X capacitor when a plug is removed from the outlet.

However, in the AC-DC converter in which the resistor for discharging is connected in parallel with the X capacitor, the electric power is constantly consumed during connection of the Ac power supply, which causes increase of the standby power consumption during the no-load state and during standby.

Thus, in order to reduce the power consumption during standby, there are suggested inventions which can promptly discharge the remaining electric charges in the X capacitor when the plug removal is detected, by providing a switch for discharging of the X capacitor in the semiconductor device for power supply control (for example, see JP 2012-170289 A and JP 2016-158310 A).

As a semiconductor device for power supply control included in a switching power supply device, there is a semiconductor device for power supply control which has a brownout detection function of detecting a brownout state and stopping the switching control, the brownout state being a state in which the AC input voltage decreases to be equal to or lower than a predetermined voltage continuously for a certain time or more (see JP 5343393 B2). The semiconductor device for switching power supply control disclosed in JP 5343393 B2 includes a starting circuit and a comparator which detects the generation of the brownout state. By detecting the brownout only in the off state of the starting circuit, a common terminal is used as the current inflow terminal to the starting circuit and the voltage detection terminal for detecting the brownout.

On the other hand, in the semiconductor device for power supply control disclosed in JP 2016-158310 A, a high voltage input starting terminal (current inflow terminal) to which the starting circuit is connected is used for detecting plug removal. Accordingly, in a case where the power supply control semiconductor device is provided with a brownout detection function and a discharging function of the X capacitor and the high voltage input starting terminal is used as a detection terminal for both functions, it is greatly important to accurately detect the brownout state and the plug removal state and execute the corresponding operation.

In addition, the invention of JP 2016-158310 A uses a timer circuit for detecting a duration of the plug removal state, and the invention of JP 5343393 B2 uses a delay circuit (timer circuit) for detecting a duration of the brownout state. If a timer circuit which measures a time such as several ten milliseconds (ms) is to be provided, the possession area of the circuit becomes very large. Thus, in a case of providing both of the brownout detection function and the X capacitor discharging function to the semiconductor device for power supply control, if separate timer circuits are provided for the respective functions, there is a problem that the chip size increases and the noise easily occurs when a plurality of timer circuits operate at the same time.

SUMMARY

The present invention has been made in consideration of the above problems, and an object of the present invention is to provide a semiconductor device for switching power supply control and an AC-DC converter which can accurately detect the brownout state and the plug removal state by using a high voltage input starting terminal as a detection terminal for both of the brownout detection function and the discharging function of X capacitor when both of the functions are provided.

Another object of the present invention is to provide a semiconductor device for switching power supply control and an AC-DC converter which can avoid the increase of chip size and suppress the generation of noise when both of the brownout detection function and the X capacitor discharging function are provided.

To achieve at least one of the abovementioned objects, according to an aspect of the present invention, there is provided a semiconductor device for switching power supply control including: a high voltage input starting terminal to which a voltage obtained by rectifying an alternating current voltage is input; a discharger which is provided between the high voltage input starting terminal and a ground point; and an input state detection circuit which is connected to the high voltage input starting terminal and detects an input state of the alternating current voltage, wherein the input state detection circuit includes: a voltage divider which includes a high withstand voltage resistor that divides the voltage of the high voltage input starting terminal; a peak hold circuit which includes a capacitor and a discharge switch of the capacitor, and holds a peak voltage of a voltage divided by the voltage divider; a first comparator which compares the voltage divided by the voltage divider with a voltage obtained by proportional reduction of the voltage held by the peak hold circuit, and which detects generation of a plug removal state; a second comparator which compares the voltage divided by the voltage divider with a predetermined voltage, and detects generation of a brownout state; a timer circuit which measures a predetermined time that is set in advance; and a control signal generation circuit which generates a signal to turn on the discharger or a signal to stop outputting of a switching control signal based on an output of the timer circuit, Td1, Td2 and Td3 are set to have a relationship of Td1<Td2<Td3, Td1 being a delay time until the capacitor is discharged after an output of the second comparator is changed in accordance with decrease of an alternating current input, Td2 being a delay time for determining the plug removal state, and Td3 being a delay time for determining the brownout state, and at least the delay time Td2 and the delay time Td3 are measured by a common timer circuit.

Preferably, the semiconductor device for switching power supply control includes: a clock generation circuit which generates a clock signal of a predetermined period; and a switching control signal generation circuit which generates the switching control signal based on the clock signal from the clock generation circuit, wherein in response to that the delay time Td2 is measured by the timer circuit, the control signal generation circuit generates and outputs a control signal for turning on the discharger, and in response to that the delay time Td3 is measured by the timer circuit, the control signal generation circuit generates a brownout detection signal and supplies the generated brownout detection signal to the switching control signal generation circuit to stop outputting of the switching control signal.

Preferably, in the semiconductor device for switching power supply control, the control signal generation circuit generates a control signal for turning on the discharge switch of the peak hold circuit to discharge the capacitor in response to that the delay time Td1 is measured by the timer circuit.

Preferably, in the semiconductor device for switching power supply control, the common timer circuit is reset and starts a time measuring operation in response to output change of the first comparator and the second comparator, and resetting of the timer circuit is prohibited even when an output of the first comparator changes, until the second comparator detects start of the brownout state and the delay time Td3 elapses.

Preferably, in the semiconductor device for switching power supply control, the common timer circuit measures the delay time Td1, the delay time Td2, and the delay time Td3.

Preferably, the semiconductor device for switching power supply control includes: a switch which is connected between the high voltage input starting terminal and a power supply terminal to which a voltage obtained by rectifying an induced voltage in an auxiliary winding wire of a transformer is applied; and a starting control circuit which controls the switch when a voltage is applied to the high voltage input starting terminal, wherein the switch includes a depression type N-channel MOS transistor with a high withstand voltage, and the discharger is connected in series with the switch between the high voltage input starting terminal and the ground point.

According to another aspect of the present invention, there is provided an AC-DC converter including: the above semiconductor device for switching power supply control; a transformer which includes an auxiliary winding wire and and in which a voltage obtained by rectifying an alternating current voltage is applied to a primary-side winding wire; and a switching element which is connected to the primary-side winding wire, wherein the switching element is controlled by using the semiconductor device for switching power supply control.

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein:

FIG. 7 is a waveform diagram showing four patterns of output state of a comparator for detecting plug removal and a comparator for detecting the brownout generated according to the level of AC input;

DESCRIPTION OF EMBODIMENTS

Hereinafter, a preferred embodiment of the present invention will be described with reference to the drawings.

Figure 1:
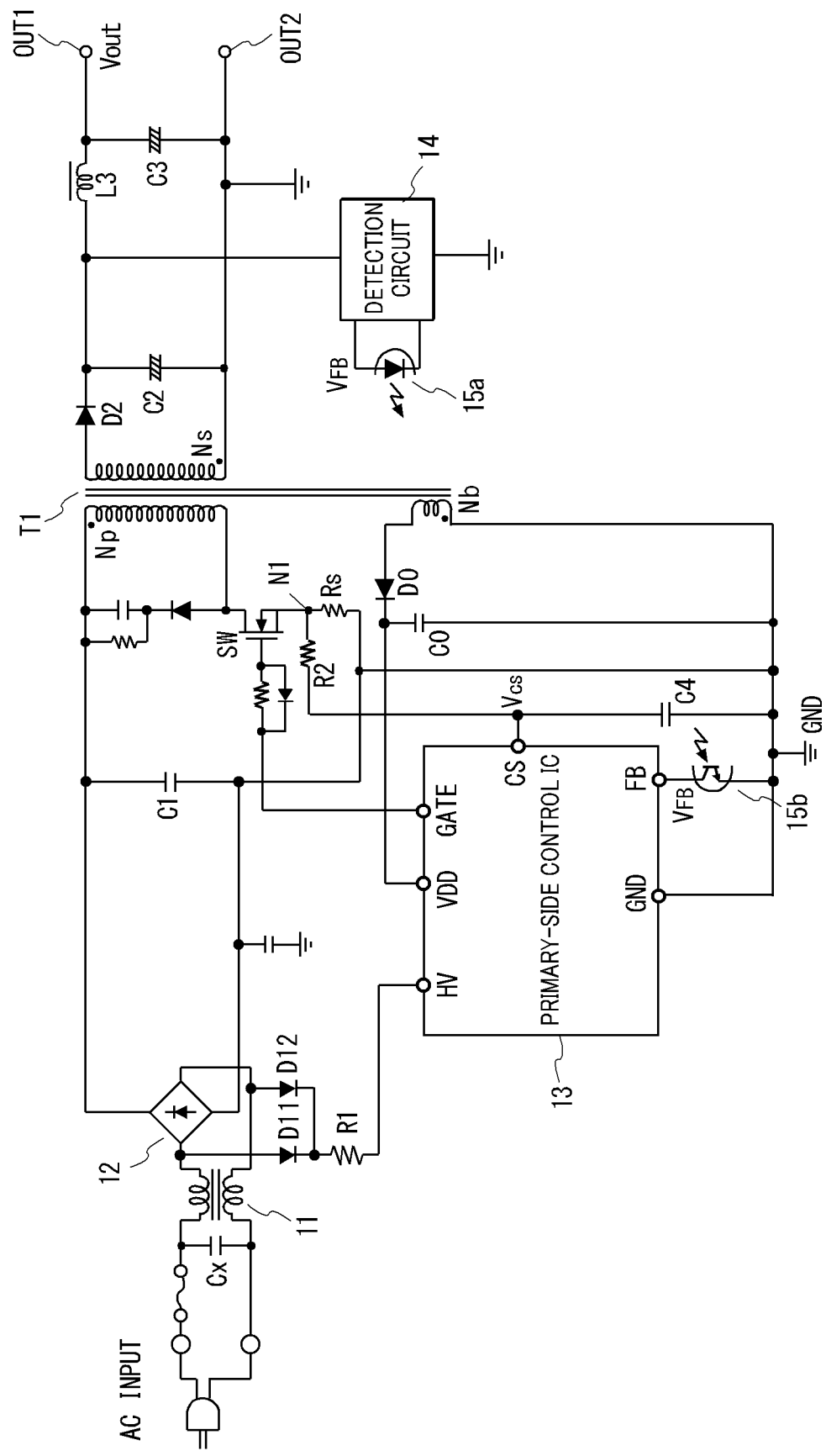
FIG. 1 is a circuit configuration view showing an embodiment of an AC-DC converter as an isolated direct current power supply device according to the present invention.

FIG. 1 is a circuit configuration view showing an embodiment of the AC-DC converter as an isolated direct current power supply device to which a switching power supply control semiconductor device according to the present invention is applied.

The AC-DC converter according to this embodiment includes: an X capacitor Cx connected between AC terminals for attenuating the normal-mode noise; a noise blocking filter 11 including a common-mode coil and the like; a diode bridge circuit 12 that rectifies an alternating current voltage (AC); a smoothing capacitor C1 that smooths the rectified voltage; a transformer T1 for voltage conversion including a primary-side winding wire Np, a secondary-side winding wire Ns, and an auxiliary winding wire Nb.

The AC-DC converter also includes: a switching transistor SW including an N-channel MOSFET connected in series with the primary-side winding wire Np of the transformer T1; and a switching power supply control semiconductor device 13 that drives the switching transistor SW. In this embodiment, the switching power supply control semiconductor device 13 is formed as a semiconductor integrated circuit (hereinafter referred to as a power supply control IC) on a single semiconductor chip such as a single-crystal silicon or the like.

On the secondary side of the transformer T1, a rectifying diode D2 connected in series with the secondary-side winding wire Ns and a smoothing capacitor C2 connected between a cathode terminal of this diode D2 and the other terminal of the secondary-side winding wire Ns are provided. By supplying an electric current intermittently to the primary-side winding wire Np, the alternating current voltage is induced in the secondary-side winding wire Ns, and by rectifying and smoothing this induced alternating current voltage, the direct current voltage Vout according to the winding wire ratio between the primary-side winding wire Np and the secondary-side winding wire Ns is output.

In addition, on the secondary side of the transformer T1, there are provided a coil L3 and a capacitor C3 that form a filter for blocking the switching ripple noise and the like occurring in the switching operation on the primary side, and there are also provided a detection circuit 14 for detecting the output voltage Vout and a photodiode 15a as a light emission-side element of a photocoupler which is connected to the detection circuit 14 and transmits a signal corresponding to the detected voltage to the power supply control IC 13. On the primary side, a phototransistor 15b is provided as a light reception-side element which is connected between a ground point and a feedback terminal FB of the power supply control IC 13 and receives a signal from the detection circuit 14.

On the primary side of the AC-DC converter according to this embodiment, there is provided a rectifying/smoothing circuit that includes a rectifying diode DO connected in series with the auxiliary winding wire Nb, and a smoothing capacitor C0 connected between the ground point GND and a cathode terminal of the diode DO. The voltage rectified and smoothed in the rectifying/smoothing circuit is applied to a power supply voltage terminal VDD of the power supply control IC 13.

The power supply control IC 13 includes a high voltage input starting terminal HV to which the voltage before being rectified in the diode bridge circuit 12 is applied through diodes D11 and D12 and a resistor R1. The power supply control IC 13 is configured to operate by the voltage from this high voltage input starting terminal HV when the power is input (immediately after a plug is inserted into an outlet).

In addition, in the present embodiment, a resistor Rs for current detection is connected between the ground point GND and a source terminal of the switching transistor SW, and a resistor R2 is connected between a current detection terminal CS of the power supply control IC 13 and a connection node N1 between the switching transistor SW and the current detection resistor Rs. Furthermore, a capacitor C4 is connected between the ground point and the current detection terminal CS of the power supply control IC 13. The resistor R2 and the capacitor C4 form a low-pass filter.

Next, with reference to FIG. 2, a specific structure example of the power supply control IC 13 will be described.

Figure 2:
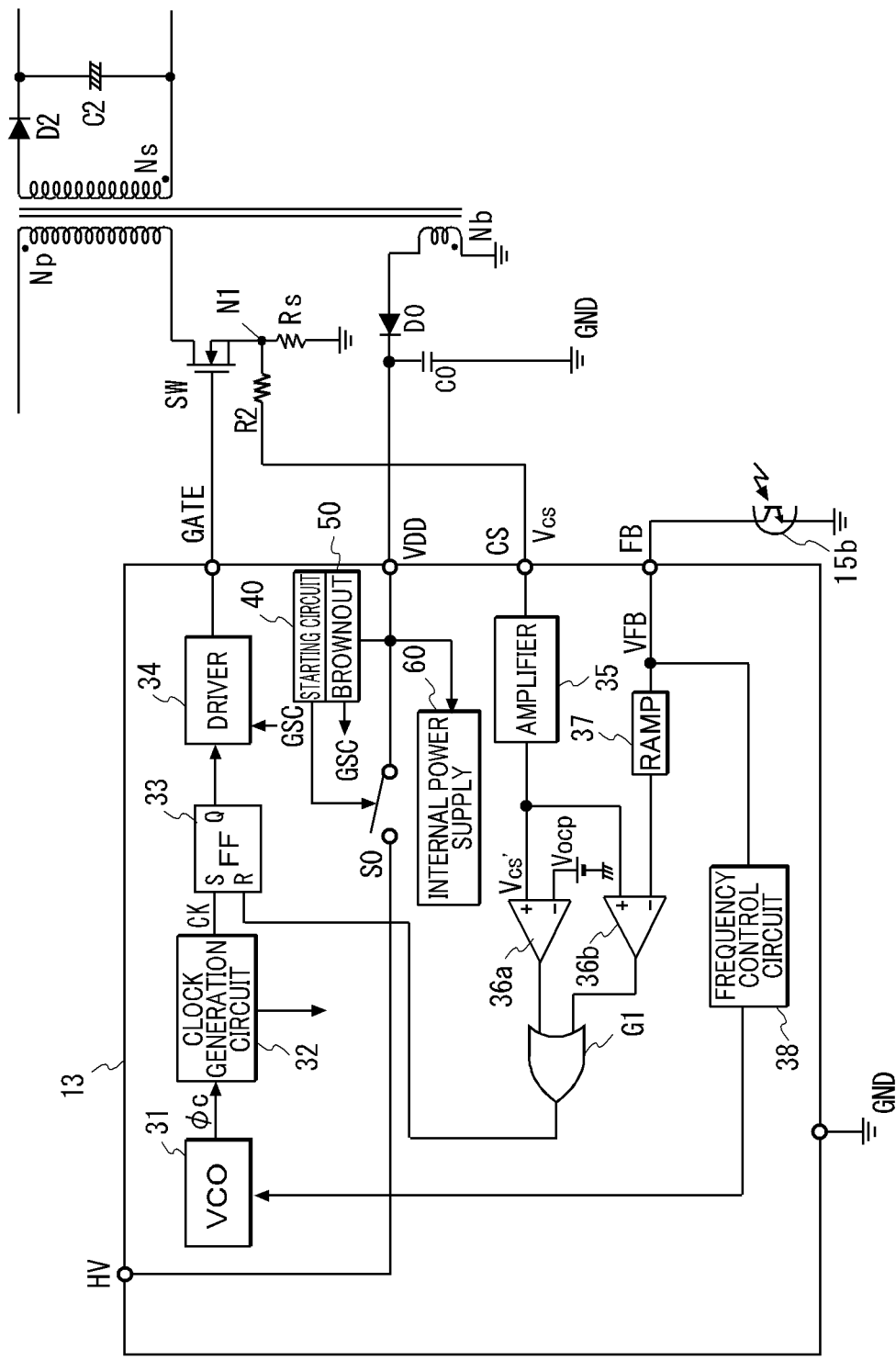
FIG. 2 is a circuit configuration view showing a configuration example of a primary-side switching power supply control circuit (power supply control IC) of a transformer in the AC-DC converter in FIG. 1.

As illustrated in FIG. 2, the power supply control IC 13 according to the example includes: an oscillation circuit 31 that oscillates at a frequency according to a voltage VFB of a feedback terminal FB; a clock generation circuit 32 including a circuit like a one-shot pulse generation circuit that generates a clock signal CK for providing the timing to turn on the primary-side switching transistor SW on the basis of an oscillation signal Φc generated in the oscillation circuit 31; an RS/flip-flop 33 that is set by the clock signal CK; and a driver (a driving circuit) 34 that generates a driving pulse GATE of the switching transistor SW in accordance with the output of the flip-flop 33.

Moreover, the power supply control IC 13 includes: an amplifier 35 that amplifies the voltage Vcs input to the current detection terminal CS; a comparator 36a as a voltage comparison circuit that compares an electric potential Vcs' amplified by the amplifier 35 with a comparison voltage (threshold voltage) Vocp for monitoring the overcurrent state; a waveform generation circuit 37 that generates a voltage RAMP with a predetermined waveform on the basis of the voltage VFB of the feedback terminal FB; a comparator 36b that compares the electric potential Vcs' that is amplified by the amplifier 35 with the waveform RAMP generated by the waveform generation circuit 37; and an OR gate G1 that takes the logical sum of the outputs of the comparators 36a and 36b.

By the output RS of the OR gate G1 being input to a reset terminal of the flip-flop 33, the timing to turn off the switching transistor SW is provided. A pull-up resistor or a constant-current source is provided between the feedback terminal FB and an internal power supply voltage terminal, and the electric current flowing in the phototransistor 15b is converted into a voltage by the resistor.

Furthermore, the power supply control IC 13 in the example includes a frequency control circuit 38 that changes the oscillation frequency of the oscillation circuit 31, that is, the switching frequency on the basis of the voltage VFB of the feedback terminal FB in accordance with a predetermined characteristic. Although not shown, the oscillation circuit 31 includes a current source which allows the electric current to flow in accordance with the voltage from the frequency control circuit 38, and is formed of an oscillator whose oscillation frequency changes depending on the amount of the electric current supplied from the current source.

The power supply control IC 13 may include a duty limiting circuit that generates a maximum duty reset signal to limit the duty (Ton/Tcycle) of the driving pulse GATE so that the duty does not exceed a prescribed maximum value (for example, 85% to 90%) on the basis of the clock signal CK output from the clock generation circuit 32.

Furthermore, the power supply control IC 13 in the example includes: a starting switch S0 which is provided between the high voltage input starting terminal HV and the power supply voltage terminal VDD; a starting circuit (start circuit) 40 which, when the voltage is input to the high voltage input starting terminal HV via the resistor R1, turns on the starting switch S0 to start the IC; a brownout and plug removal detection circuit 50 which detects the brownout state and generates a signal to stop the switching control, and detects whether or not the plug of the AC power supply is removed from the outlet and generates a signal to turn on the discharge switch of the X capacitor Cx (FIG. 1); and an internal power supply circuit 60 which generates the internal power supply voltage necessary for the operation of the internal circuit on the basis of the voltage of the power supply voltage terminal VDD.

Figure 3:
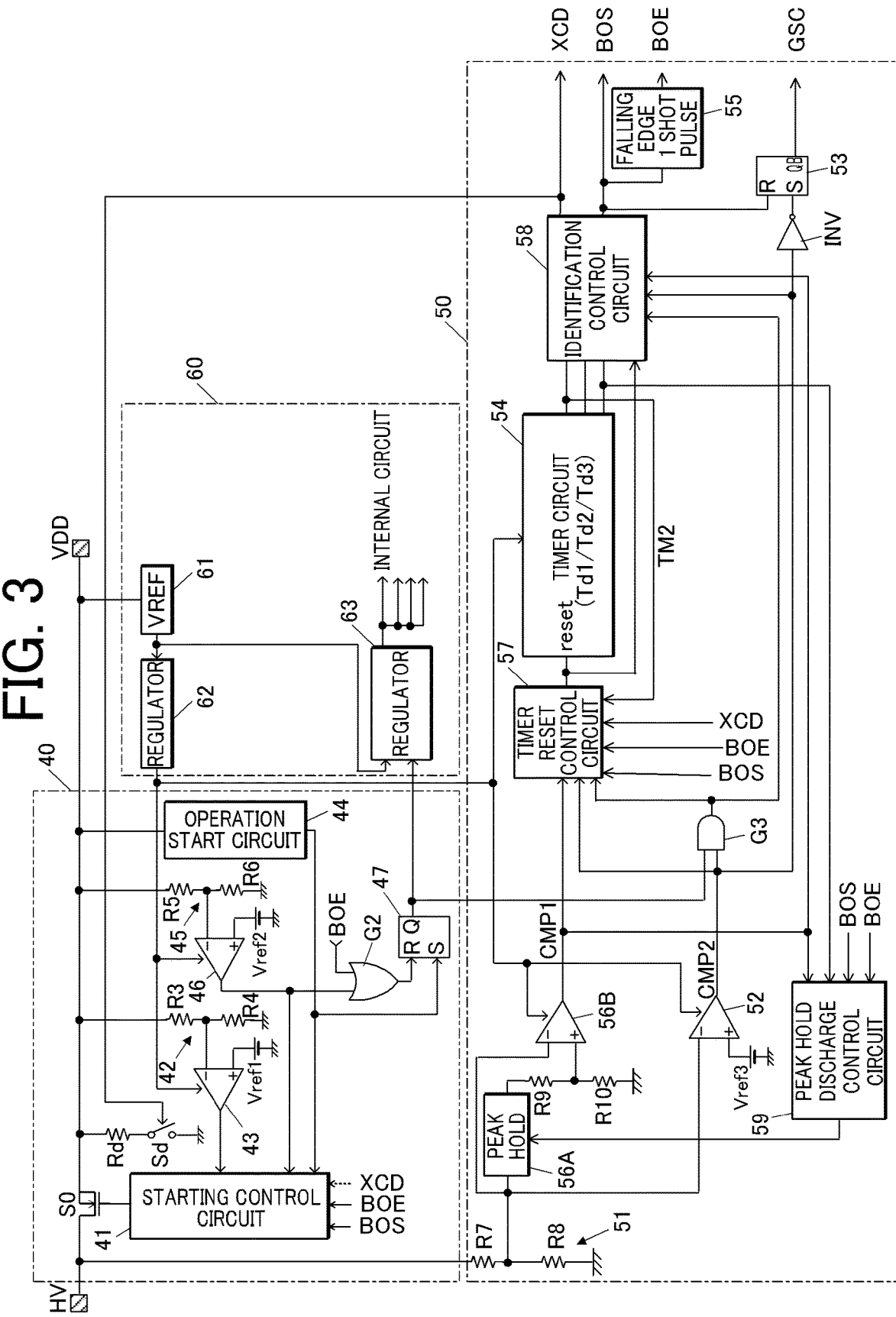
FIG. 3 is a circuit configuration view showing a configuration example of a starting circuit and a brownout and plug removal detection circuit included in the power supply control IC in the example.

FIG. 3 shows a configuration example of the starting circuit 40 and the brownout and plug removal detection circuit 50 and two regulators included in the internal power supply circuit 60 in the power supply control IC in FIG. 2.

As shown in FIG. 3, the internal power supply circuit 60 includes a reference voltage circuit 61 which generates a reference voltage VREF, a regulator 62 which generates the power supply voltage of the starting circuit 40 and the brownout and plug removal detection circuit 50, and a regulator 63 which generates the power supply voltage of the internal circuit (circuit blocks 31 to 38 shown in FIG. 2). The regulator 62 is configured to continue the operation when the voltage of the power supply voltage terminal VDD is equal to or more than a predetermined voltage that is determined by the characteristic of the regulator. The regulator 63 is configured to be able to stop the operation by a control signal even if the voltage of the power supply voltage terminal VDD is the predetermined voltage or more.

As shown in FIG. 3, there are provided a starting control circuit 41 controlling the starting switch S0 between the high voltage input starting terminal HV and the power supply voltage terminal VDD for controlling starting of the switching power supply control semiconductor device 13, a voltage division circuit 42 including resistors R3 and R4 that are connected in series between the power supply voltage terminal VDD and the ground point, and a comparator 43 to which the divided voltage and the reference voltage Vref1 are input and which has a hysteresis characteristic. The starting switch S0 is formed of a depression type N-channel MOS transistor with a high withstand voltage which is normally turned on.

The potential difference between the high voltage input starting terminal HV and the power supply voltage terminal VDD is 0V before insertion of the plug into the outlet. When a voltage is applied to the high voltage input starting terminal HV by the insertion of the plug, an electric current flows from the high voltage input starting terminal HV to the power supply voltage terminal VDD through the starting switch S0 that is normally turned on, the capacitor C0 (FIG. 1) externally provided to the VDD terminal is charged, and the voltage of the VDD terminal gradually rises. Accordingly, the high voltage input starting terminal HV functions as a current inflow terminal.

The starting control circuit 41 turns off the starting switch S0 when the VDD terminal reaches a predetermined voltage such as 21V, for example. When the VDD terminal reaches the predetermined voltage such as 21V, the regulator 63 operates and the switching control of the switching transistor SW by the internal circuit is started. On the other hand, when the VDD terminal falls to the operation stop voltage (for example, VDD=6.5V) of the regulator 62, the starting switch S0 is turned on, and the voltage of the VDD terminal rises again to 21V.

When the protection function or the brownout detection function operates, the starting control circuit 41 controls the VDD terminal voltage within a certain voltage range on the basis of the output of the comparator 43. The starting control circuit 41 is configured to repeatedly execute the control of turning on the starting switch S0 to allow an electric current to flow from the high voltage input starting terminal HV to the power supply voltage terminal VDD when the voltage of the VDD terminal falls to 12V, for example, and of turning off the starting switch S0 to block the electric current from the high voltage input starting terminal HV when the voltage of the VDD terminal rises to 13V, for example.

The starting circuit 40 further includes: an operation start circuit 44 which constantly monitors the voltage of the power supply voltage terminal VDD and, when the voltage of VDD reaches a voltage such as 19.6V, for example, starts the regulator 63 that generates the power supply voltage of the internal circuit to generate a signal to start the operation of the internal circuit; a voltage division circuit 45 formed of resistors R5, R6 connected in series between the ground point and the power supply voltage terminal VDD; and an operation stop circuit 46 formed of a comparator (voltage comparison circuit) which compares the divided voltage and a reference voltage Vref2, and, when the VDD falls to 6.5V, for example, stops the operation of the internal circuit by stopping the regulator 63 which generates the internal power supply voltage. The operation start circuit 44 may be a circuit configured to be able to detect that the monitoring target becomes a predetermined voltage or more without using a reference voltage, or may be configured by a comparator (voltage comparison circuit) using the reference voltage.

The output signal of the operation start circuit 44 is input to a set terminal of an RS flip flop (RS1) 47. The output signal of the above operation stop circuit 46 is input to a reset terminal of the RS flip-flop 47 via an OR gate G2, and the output signal of the flip-flop 47 is supplied as an operation control signal of the regulator 63 which generates the power supply voltage of the internal circuit. The above starting control circuit 41 can be configured by including a resistor which is connected between the VDD terminal and the gate terminal of the starting switch S0, a Zener diode which is connected in the opposite direction between the ground point and the gate terminal of S0, a MOS transistor which is connected in parallel with the Zener diode, and a logic circuit which turns on and off the MOS transistor with the signals from the comparator 43, operation start circuit 44 and operation stop circuit 46, and the signals BOS and BOE from the brownout and plug removal detection circuit 50 as inputs, for example.

In the starting circuit 40, there is provided a discharger which is formed of a resistor Rd and a switch Sd connected in series with the starting switch S0 between the high voltage input starting terminal HV and the ground point. Though the discharger (Rd, Sd) is shown in the starting circuit 40 in the drawing, the discharger may be configured as a functional circuit separate from the starting circuit 40. The switch Sd for discharging can be configured by an enhancement-type MOS transistor with a middle withstand voltage, for example.

The brownout and plug removal detection circuit 50 includes a voltage division circuit 51 formed of high withstand voltage resistors R7 and R8 which are connected in series between the high voltage input starting terminal HV and the ground point, a comparator 52 which has a hysteresis characteristic for detecting that the voltage of HV falls to a threshold that is set to be a voltage which is approximately ⅔ of the peak value of AC input or less than 100V by comparing the voltage divided by the voltage division circuit 51 and a reference voltage Vref3, and an RS flip-flop (RS2) 53 which operates by the output signal of the inverter INV which inverts the output of the comparator 52. An inversion output QB of the flip-flop 53 is supplied to the driver 34 (FIG. 2) as an output stop signal GSC to stop the output of the driving pulse of the switching element SW. Thus, in a case where the AC power supply is input in a low AC input state, that is, the power supply control IC is started in the brownout state, an electric current flows to the VDD terminal by the starting circuit 40 in that state, and the electric potential of VDD terminal reaches the IC operation start voltage, it is possible not to output the driving pulse GATE of the switching element SW.

The brownout and plug removal detection circuit 50 includes: a timer circuit 54 which measures a predetermined delay time from the detection of brownout and the detection of plug removal; and an edge detection circuit 55 which detects the falling edge of the output signal of the timer circuit 54. The output signal of the timer circuit 54 is input to the reset terminal of the RS flip-flop 53.

As the delay time from the detection of brownout and as the predetermined delay time from the detection of plug removal, 60 ms and 30 ms can be respectively selected, for example. The timer circuit 54 is configured to perform the time measuring operation by the signal of the oscillator formed of a ring oscillator or the like with the regulator 62 as a power supply.

Furthermore, the brownout and plug removal detection circuit 50 includes: a peak hold circuit 56A which holds a peak value of the voltage divided by the voltage division circuit 51 which divides the voltage of the high voltage input starting terminal HV; and a comparator 56B which compares the voltage divided by resistors R9 and R10 connected between the ground point and the output terminal of the peak hold circuit 56A and the voltage divided by the voltage division circuit 51. There are also provided: a timer reset control circuit 57 to which the output of the comparator 56B and the output signal of the comparator 52 and the AND gate G3 are input; an identification control circuit 58 which is provided at the subsequent stage of the timer circuit 54; and a discharge control circuit 59 which generates a discharge signal of the capacitor (C4 in FIG. 6) included in the peak hold circuit 56A on the basis of the output of the comparator 56B, the output of the timer circuit 54, and the output of the identification control circuit 58.

In the example, the timer circuit 54 can measure a predetermined delay time from the detection of brownout and the detection of plug removal and a delay time of the signal to discharge the peak hold circuit 56A. The identification control circuit 58 is configured to determine the plug removal by measuring, with the timer circuit 54, the time during which the voltage Vn0 divided by the voltage division circuit 51 is not lower than the voltage VTH (for example, value of 75% of peak value) which is obtained by proportional reduction of the voltage held by the peak hold circuit 56A. In detail, when the state in which the Vn0 is not lower than the VTH continues for 30 ms, for example, the identification control circuit 58 determines that the plug removal occurs, and outputs a discharge signal of the X capacitor. The VTH which is a threshold level for determining the plug removal is set to be higher than the brownout detection level at the time of normal operation with sufficiently high AC input.

The time measuring operation of the timer circuit 54 is started by the output signal of the AND gate G3 to which the output signal of the comparator 52 and the output signal of the flip-flop 47 included in the starting circuit 40 are input. When a predetermined delay time (for example, 60 ms) elapses from the detection of brownout, the identification control circuit 58 determines that the AC input is the brownout state on the basis of the output signal of the timer circuit 54, and outputs the brownout detection signal BOS. The RS flip-flop 53 is reset by this signal, and the output stop signal GSC of the driving pulse is output.

Furthermore, after the stop of outputting by the detection of brownout, when the voltage of the high voltage input starting terminal HV rises to invert the output signal of the comparator 52, the RS flip-flop 53 is set by the inverter INV, the output stop signal GSC changes to a low level and the output stop state is released. By the inversion of the output signal of the comparator 52, the output of the AND gate G3 changes to a low level, the falling is detected by the falling edge detection circuit (DED in FIG. 4) in the timer reset control circuit 57 and the timer circuit 54 is reset. Thus, the output (TM3) of the timer circuit 54 changes, and the brownout detection signal BOS output from the identification control circuit 58 which receives the above signal changes to a low level. The edge detection circuit 55 which detects the falling edge outputs the brownout end signal (pulse) BOE.

The brownout end signal (pulse) is configured to reset the RS flip-flop 47 via the OR gate G2.

Figure 4:
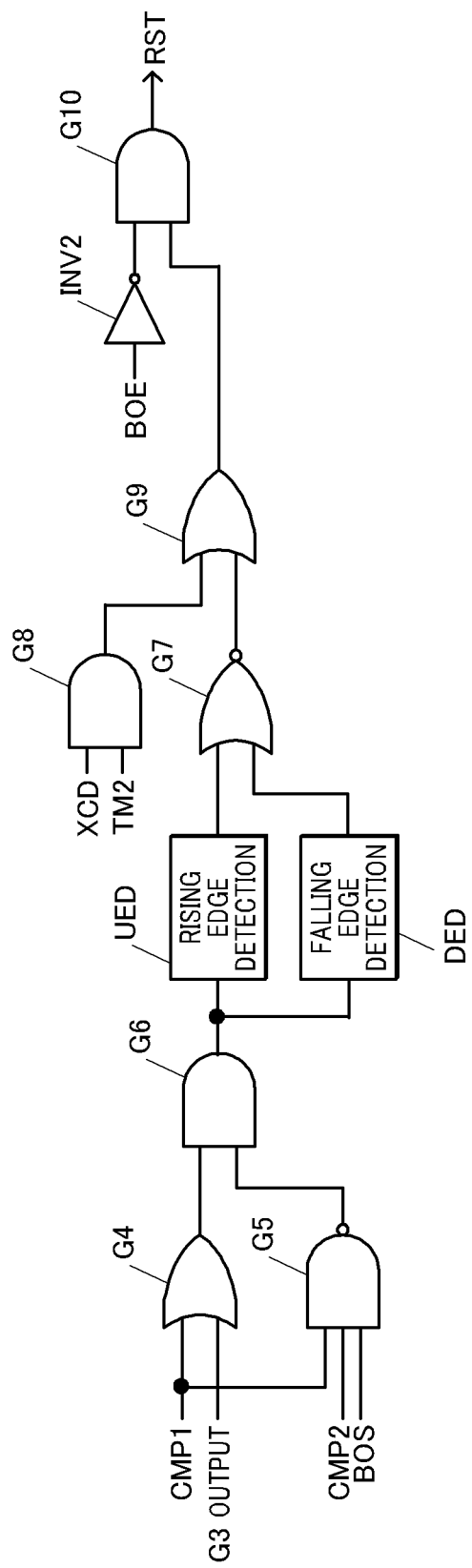
FIG. 4 is a circuit configuration view showing a configuration example of a timer reset control circuit included in the brownout and plug removal detection circuit.
Figure 5:
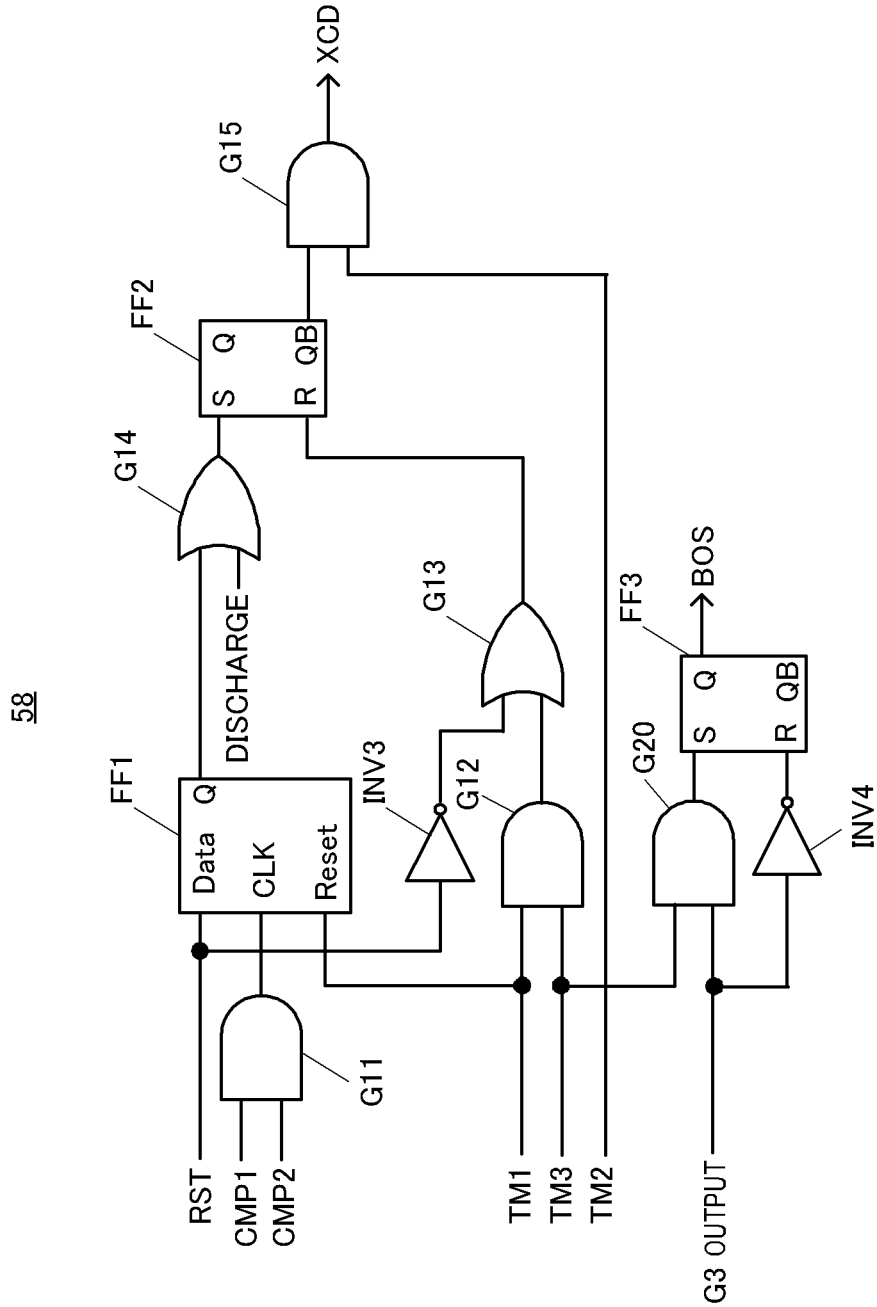
FIG. 5 is a circuit configuration view showing a configuration example of an identification control circuit included in the brownout and plug removal detection circuit.
Figure 6:
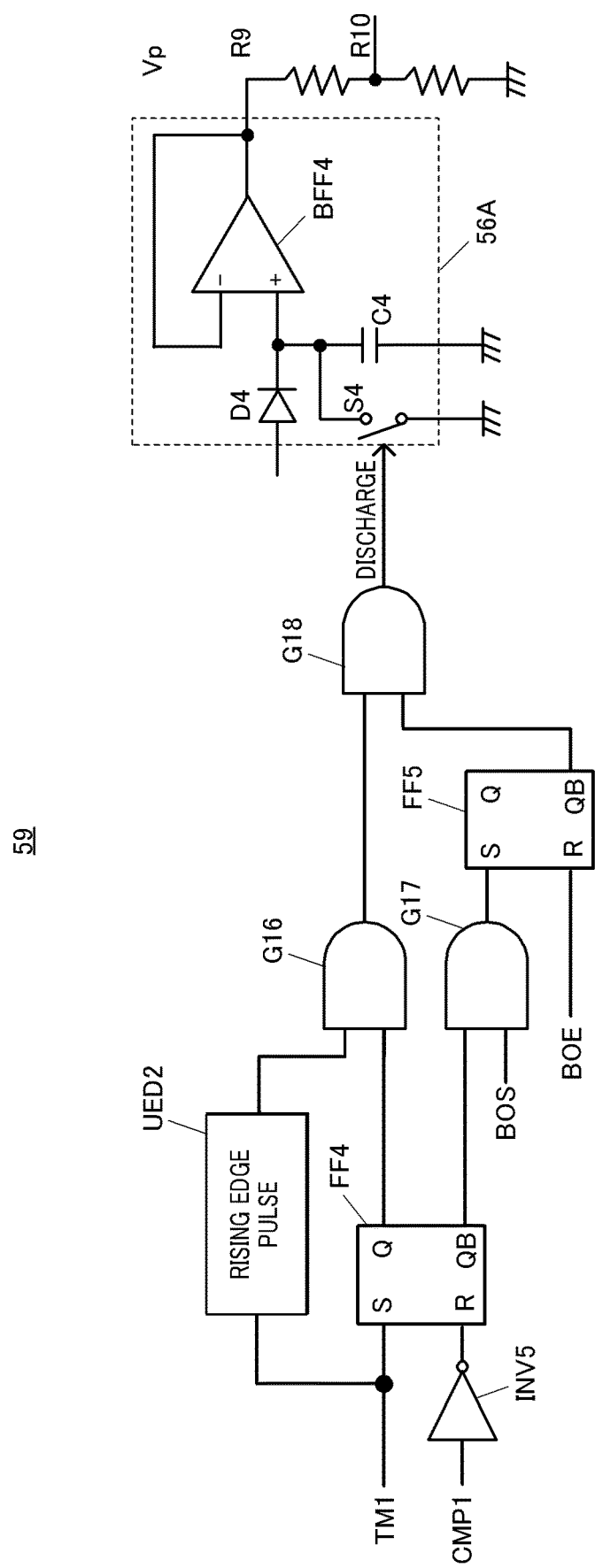
FIG. 6 is a circuit configuration view showing a configuration example of a peak hold circuit and a discharge control circuit included in the brownout and plug removal detection circuit.

FIG. 4 shows a specific circuit example of the timer rest control circuit 57 included in the brownout and plug removal detection circuit 50 in FIG. 3. FIG. 5 shows a specific circuit example of the identification control circuit 58. FIG. 6 shows a specific circuit example of a peak hold circuit 56A and a discharge control circuit 59.

As shown in FIG. 4, the timer reset control circuit 57 includes: an OR gate G4 to which the output CMP1 of the comparator 56B for detecting plug removal and the output of the AND gate G3 are input; a NAND gate G5 to which the output CMP1 of the comparator 56B and the output CMP2 of the comparator 52 for detecting the brownout and the brownout detection signal BOS output from the identification control circuit 58 are input; an AND gate G6 to which the output of the NAND gate G5 and the output of the OR gate G4 are input; a rising edge detection circuit UED which detects the rising edge of the output of the AND gate G6; and a falling edge detection circuit DED which detects the falling edge of the output of the AND gate G6.

The timer reset control circuit 57 further includes: a NOR gate G7 to which the output of the rising edge detection circuit UED and the output of the falling edge detection circuit DED are input; an AND gate G8 to which an X capacitor discharge signal XCD output from the identification control circuit 58 and a timeout signal TM2 of a plug removal detection delay time Td2 output from the timer circuit 54 are input; and an OR gate G9 to which the output of the AND gate G8 and the output of the NOR gate G7 are input; and an AND gate G10 to which a signal obtained by inverting the brownout end signal BOE output from the identification control circuit 58 with the inverter INV2 is input. The output of the AND gate G10 is supplied as the reset signal RST to the timer circuit 54.

As shown in FIG. 5, the identification control circuit 58 includes: an AND gate G11 to which the output CMP1 of the comparator 56B for detecting plug removal and the output CMP2 of the comparator 52 for detecting the brownout are input; a D-type flip-flop FF1 which takes in a rest signal RST that is the output of the timer reset control circuit 57 with the output of the AND gate G11 as a clock signal; an AND gate G12 to which the timeout signal TM1 of the discharge delay time Td1 of the peak hold circuit and the timeout signal TM3 of the brownout detection delay time Td3 are input; and an OR gate G13 to which the output of the AND gate G12 and the signal obtained by inverting the reset signal RST with the inverter INV3 are input.

The identification control circuit 58 includes: an OR gate G14 to which the output of the D-type flip-flop FF1 and an output signal "DISCHARGE" of the discharge control circuit 59 are input; an RS flip-flop FF2 which is set and reset by the output of the OR gate G14 and the output of the OR gate G13; and an AND gate G15 to which the inverted output of the flip-flop FF2 and the timeout signal TM2 of the delay time Td2 of the plug removal detection are input. The output of the AND gate G15 is output as the discharge signal XCD of the X capacitor.

The identification control circuit 58 further includes: an AND gate G20 to which the timeout signal TM3 of the brownout detection delay time Td3 and the output of the AND gate G3 (FIG. 3) are input; and an RS flip-flop FF3 which is set and reset by the output of the AND gate G20 and the signal obtained by inverting the output of the AND gate G3 with the inverter INV4. The output of the flip-flop FF3 is output as the brownout detection signal BOS.

As shown in FIG. 6, the discharge control circuit 59 includes: an RS flip-flop FF4 which is set and reset by a timeout signal TM1 of the discharge delay time Td1 of the peak hold circuit and a signal obtained by inverting the output CMP1 of the comparator 56B for detecting plug removal with the inverter INV 5; a rising edge detection circuit UED2 which detects a rising edge of the timeout signal TM1 of the discharge delay time Td1 of the peak hold circuit; and an AND gate G16 to which the output of the rising edge detection circuit UED2 and the RS flip-flop FF4 are input.

The discharge control circuit 59 includes: an AND gate G17 to which the inverted output of the RS flip-flop FF4 and the brownout detection signal BOS are input; an RS flip-flop FF5 which is set and reset by the output of the AND gate G17 and the brownout end signal BOE; and an AND gate G18 to which the inverted output of the RS flip-flop FF5 and the output of the AND gate G16 are input. The output of the AND gate G18 is output to the peak hold circuit 56A as an output signal "DISCHARGE" of the discharge control circuit 59.

As shown in FIGS. 3 and 6, the peak hold circuit 56A includes a diode D4 whose anode terminal is connected to a node of the voltage division circuit 51; a capacitor element C4 which is connected between the cathode terminal of the diode D4 and the ground point; a buffer BFF4 formed of a voltage follower whose input terminal is connected to the connection node between the diode D4 and the capacitor element C4; and a discharge switch S4 which is connected in parallel with the capacitor element C4. The electric charges of the capacitor element C4 are discharged by the discharge switch S4 being turned on by the output signal "DISCHARGE" of the discharge control circuit 59.

The discharge signal (pulse) "DISCHARGE" from the discharge control circuit 59 to the peak hold circuit 56A is set to be output and turn on the discharge switch S4 when a predetermined time (for example, 15 ms) elapses from the reset of the timer circuit 54. The capacitor C4 of the peak hold circuit 56A is discharged in such a way because it is not possible to accurately detect the plug removal for discharging of the X capacitor if the previous high peak value is held when the peak voltage of AC input is lowered. Thus, the measuring time for discharging of the peak hold circuit 56A by the timer is set to be shorter than the detection time of discharging of the X capacitor.

As described above, the brownout detection delay time, the plug removal detection delay time, and the discharge delay time are measured by the common timer circuit 54. Thus, it is possible to reduce the possession area of the circuit and reduce the chip size of IC compared with a case where timer circuits are separately provided. The brownout detection delay time, the plug removal detection delay time, and the discharge delay time are set in a multiple-relationship such as 60 ms, 30 ms and 15 ms. Thus, in a case where the timer circuit 54 is formed of a frequency division circuit having a plurality of flip-flops in a cascade connection, the time measuring signal of 30 ms may be taken from a half step of the time measuring signal of 60 ms, and the time measuring signal of 15 ms may be taken from a quarter step of the time measuring signal of 60 ms. Thus, there is an advantage that the time measuring signal (timeout signal) can be generated easily.

The timer reset control circuit 57 and the identification control circuit 58 are provided because the states of the output CMP1 of the comparator 56B (Plugout Comp) for detecting plug removal and the output CMP2 of the comparator 52 (Brownout Comp) for detecting the brownout are classified into four cases as shown in FIGS. 7A to 7D according to the AC input level, and it becomes difficult to perform setting of the timing to reset the timer when the above three types of delay times are measured by a common timer circuit if each of the states is not grasped. In detail, for example, if the timer circuit 54 is reset in order to start the time measuring of the discharge delay time during detection of the brownout, the time measuring of the brownout detection delay time is interrupted. Thus, such an operation needs to be avoided.

Among FIGS. 7A to 7D, FIG. 7A is a waveform diagram when the AC input level is sufficiently high and the power supply control IC 13 performs the normal operation, and the plug removal occurs at a timing when the AC input is higher than the plug removal detection level. In this case, both of the outputs CMP1 and CMP2 of the comparator 56B for detecting plug removal and the comparator 52 for detecting brownout are at low levels.

FIG. 7B is a waveform diagram when the AC input level is sufficiently high and the power supply control IC 13 performs the normal operation, and the plug removal occurs at a timing when the AC input is lower than the brownout detection level. In this case, both of the outputs CMP1 and CMP2 of the comparator 56B for detecting plug removal and the comparator 52 for detecting brownout are at high levels.

FIG. 7C is a waveform diagram when the AC input level is lower than the brownout detection level, and the plug removal (Plugout) occurs at a timing when the AC input is higher than the plug removal detection level. In this case, the output CMP1 of the comparator 56B for detecting plug removal is at a low level, and the output CMP2 of the comparator 52 for detecting brownout is at a high level.

FIG. 7D is a waveform diagram when the AC input level is lower than the brownout detection level, and the plug removal occurs at a timing when the AC input is lower than the brownout detection level. In this case, both of the outputs CMP1 and CMP2 of the comparator 56B for detecting plug removal and the comparator 52 for detecting brownout are at high levels.

As seen from FIGS. 7B and 7D, only in the plug removal detection and the brownout detection, there occurs a situation where the respective comparator outputs are the same logic. Thus, it is not possible to accurately detect the AC input state (brown-in or brownout) in which the plug was removed. In the brownout and plug removal detection circuit 50 shown in FIG. 4, it is possible to accurately detect the brownout state and the plug removal state by grasping the four states as described above and resetting the timer circuit 54 according to the respective states.

Figure 8:
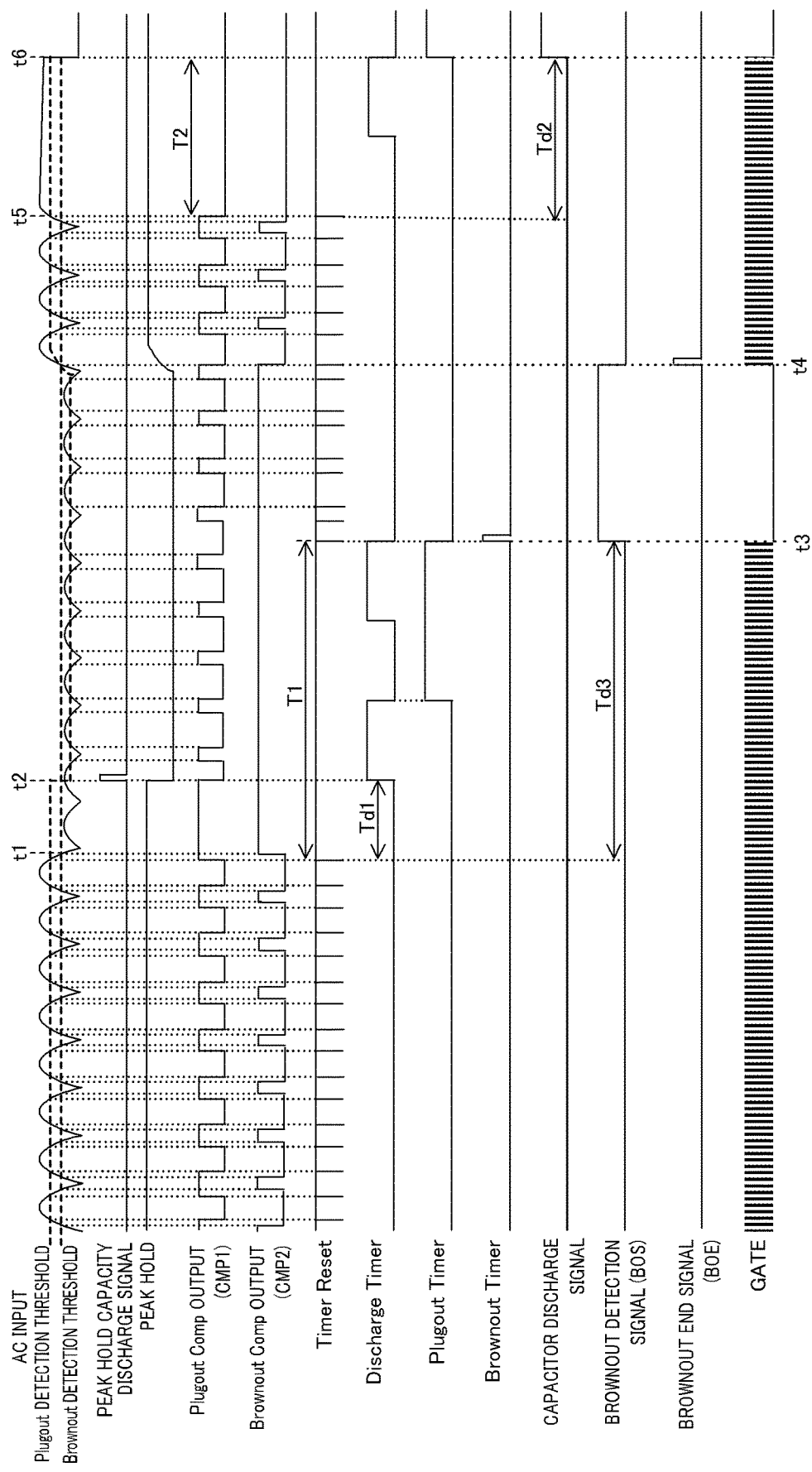
FIG. 8 is a timing chart showing the operation timing in a case where the brownout state occurs during the normal switching control operation, thereafter the AC input shifts to the brown-in state in which the AC input is sufficiently high, and plug removal occurs.

FIG. 8 shows voltage waveforms of the components in the power supply control IC 13 in a case where the AC input falls during the switching control operation by the power supply control IC 13 with a sufficiently high AC input, the brownout state continues for a while, thereafter the AC input again shifts to a sufficiently high state and the plug removal occurs. In FIG. 8, t1 is the timing when the AC input falls to go into the brownout state, t2 is the discharge timing of the peak hold capacitor, t4 is the timing when the AC input rises and comes out of the brownout state, and t5 is the timing when the plug removal occurred.

As seen from FIG. 8, the reset pulse of the timer circuit 54 is generated in synchronization with the output of the AND gate G6 of the timer reset control circuit 57, and as a result, the reset pulse is synchronized with the output of the comparator 56B. In order to measure various timer times more accurately, the reset pulse is generated for each of the rising edge and the falling edge of the output of the comparator 56B. The timer circuit 54 is configured to start the time measuring operation from 0 each time the reset pulse is input.

As seen from FIG. 8, the reset pulse of the timer circuit 54 is not generated in a period T1 from the timing t1 when the AC input falls to go into the brownout state to the timing t3 when the brownout detection signal changes to a high level, or in a period T2 from the timing t5 when the plug removal occurs to the timing t6 when the X capacitor discharge signal changes to a high level. Thus, the timer circuit 54 measures the delay time Td3 for detecting brownout from the timing t1, measures the delay time Td2 for detecting plug removal from the timing t5, and can change the respective corresponding signals.

The discharge signal (pulse) "DISCHARGE" of the peak hold capacitor is output at the timing t2 when the delay time Td1 of the discharge of the peak hold circuit 56A elapses from the timing t1 when the AC input goes into the brownout state. After the capacitor C4 of the peak hold circuit 56A is discharged, the electric charges corresponding to the AC input which decreased in the brownout are charged. Thereby, the plug removal detection level changes to a lower level, and thereafter the plug removal state is determined by this detection level. The detection level is in the rising direction when the AC input rises to come out of the brownout state. Thus, since it is not necessary to discharge the capacitor C4 of the peak hold circuit 56A, the discharge signal (pulse) "DISCHARGE" is not generated at the timing t4. The discharge pulse does not need to completely discharge the electric charges in the capacitor C4, and it is sufficient that the discharge pulse has a pulse width which can be lowered to be equal to or lower than the brownout detection level.

Figure 9:
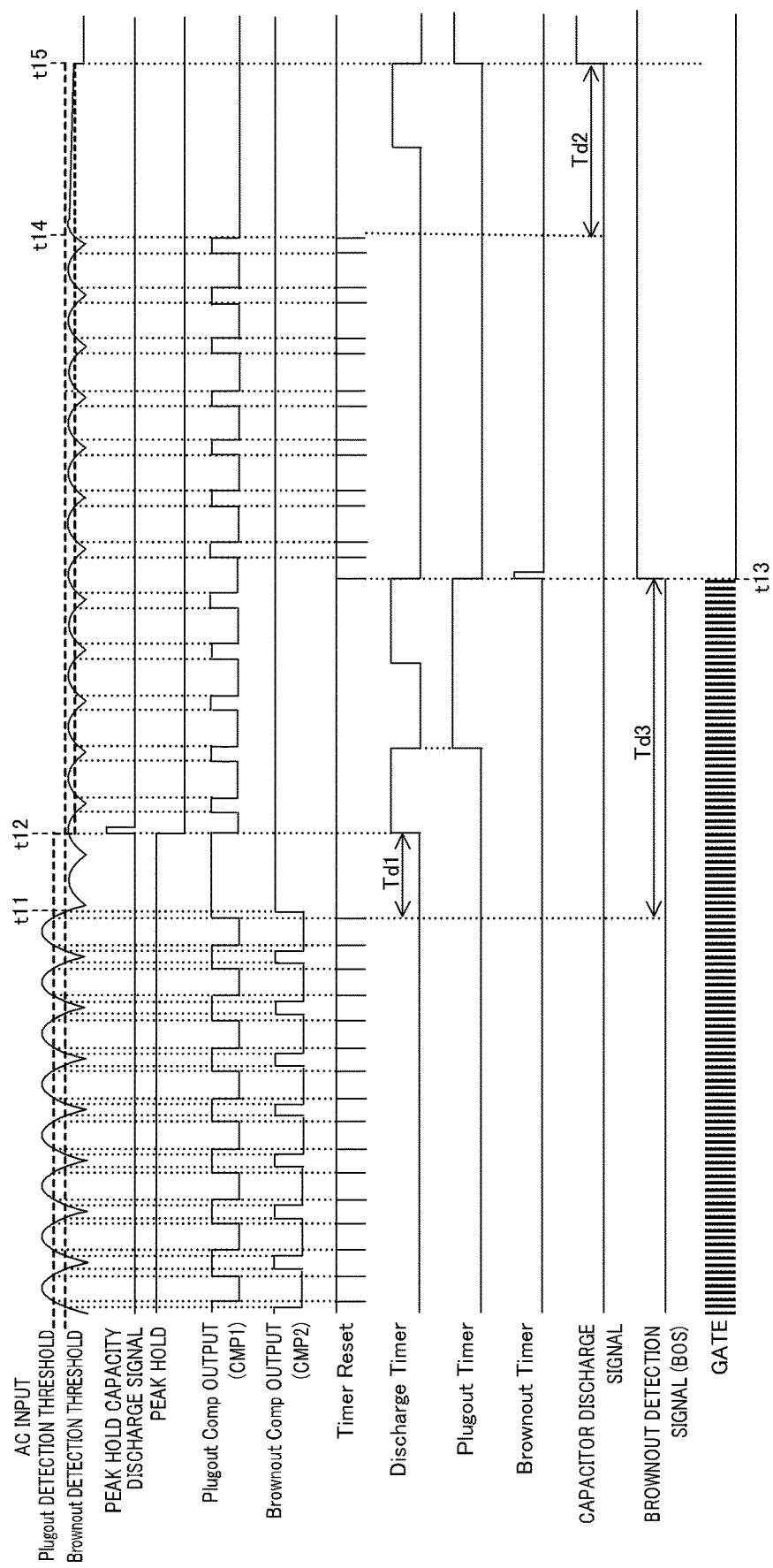
FIG. 9 is a timing chart showing the operation timing in a case where the AC input shifts to the brownout state during the normal switching control operation, and plug removal occurs during the brownout.

FIG. 9 shows voltage waveforms of the components in the power supply control IC 13 in a case where the AC input falls to shift to the brownout state during the switching control operation by the power supply control IC 13 with a sufficiently high AC input, and the plug removal occurs during the brownout. In FIG. 9, t11 is the timing when the AC input falls to go into the brownout state, and t14 is the timing when the plug removal occurs.

As seen from FIG. 9, at the timing t13 which is the timing after measuring the delay time Td3 for detecting brownout from the timing t11 when the AC input falls to go into the brownout state, the brownout detection signal changes to a high level, and switching is stopped. Even in a case where the plug removal occurs during the brownout, the discharge signal of the X capacitor changes to a high level at the timing t15 which is the timing after measuring the delay time Td2 from the timing t14. At the timing t12 which is the timing after the delay time Td1 elapses from the timing t11 of going into the brownout state, the discharge signal (pulse) of the capacitor C4 of the peak hold circuit 56A is output.

Figure 10:
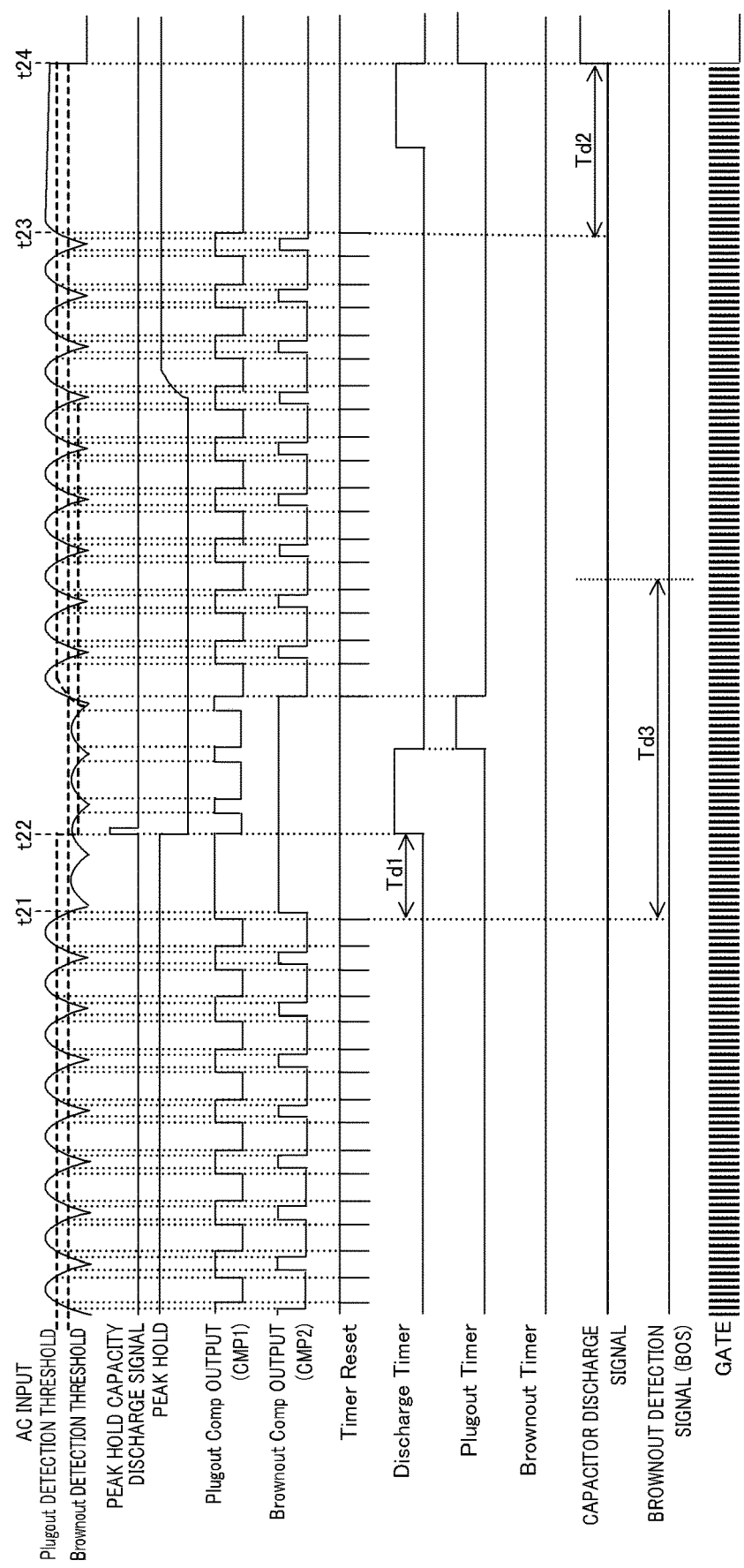
FIG. 10 is a timing chart showing the operation timing in a case where the AC input shifts to the brownout state during the normal switching control operation, and returns in a short time to the brown-in state in which the AC input is sufficiently high, and plug removal occurs.

FIG. 10 shows voltage waveforms of the components in the power supply control IC 13 in a case where the AC input falls to shift to the brownout state during the switching control operation by the power supply control IC 13 with a sufficiently high AC input, thereafter the Ac input returns to the sufficiently high state before the delay time Td3 passes, and the plug removal occurs. In FIG. 10, t21 is the timing when the AC input falls to go into the brownout state, and t23 is the timing when the plug removal occurs.

As seen from FIG. 10, since the brownout state is temporary, the brownout detection signal does not change to a high level and the switching continues. On the other hand, the discharge signal of the X capacitor changes to a high level at the timing t24 which is the timing after the delay time Td2 is measured from the timing t23 when the plug removal occurs. The discharge signal (pulse) of the capacitor of the peak hold circuit 56A is output at the timing t22 when the delay time Td1 elapses from the timing t21 when the AC input goes into the brownout state.

Among the timing charts of FIGS. 8 to 10, FIGS. 8 and 10 corresponds to FIG. 7A, and FIG. 9 corresponds to FIG. 7C. Though the detailed timing chart is omitted for a case where the plug removal occurs at the timing as shown in FIG. 7B or 7D, according to the brownout and plug removal detection circuit 50 in the example, in each case, the timer circuit 54 is reset to start measuring the delay time Td2 at the timing t0 which is the last timing when the output of the comparator 56B for detecting the plug removal changed to a high level in FIGS. 7B and 7D. At the time when Td2 is measured, the identification control circuit 58 determines that plug removal occurred and changes the discharge signal of X capacitor to a high level and discharges the X capacitor.

As mentioned above, according to the example, even if the AC plug is removed in the brownout state, it is possible to detect the plug removal and discharge the X capacitor. Furthermore, even if the input level is brown-in, in a case where the AC plug is removed at the timing of low input level, it is possible to discharge the X capacitor without detecting the brownout by mistake.

Though the present invention has been described in detail on the basis of the embodiment, the present invention is not limited to the embodiment or the example. For example, in the embodiment (FIG. 3), the discharge switch Sd is directly controlled by the discharge signal XCD of the X capacitor output from the identification control circuit 58 at the subsequent stage of the timer circuit 54. However, the discharge switch Sd may be controlled by a control signal generated with a logic of the starting control circuit 41 by inputting the discharge signal XCD of the X capacitor to the starting control circuit 41 as shown by the dotted line in FIG. 3. Though the resistor Rd for discharging and the discharge switch Sd are provided in series with the switch S0 for power supply between the high voltage input starting terminal HV and the ground point, the resistor Rd for discharging and the discharge switch Sd may be provided between the high voltage input starting terminal HV and the ground point. In such a case, the MOS transistor forming the discharge switch Sd needs to be a high withstand voltage MOS transistor (having a withstand voltage which can deal with the AC input).

In the embodiment, though the common timer circuit 54 measures three delay times that are the brownout detection delay time, the plug removal detection delay time and the discharge delay time of the peak hold circuit, the common timer circuit 54 may measure the two delay times that are the brownout detection delay time and the plug removal detection delay time, and a separate timer circuit may measure the discharge delay time of the peak hold circuit that is relatively short.

The switching transistor SW which allows an electric current to flow intermittently in the primary-side winding wire of the transformer is an element separate from the power supply control IC 13. However, the switching transistor SW may be incorporated into the power supply control IC 13 as a single semiconductor integrated circuit.

Though the embodiment has been described for a case where the present invention is applied to the power supply control IC included in a flyback type AC-DC converter, the present invention can be applied to a power supply control IC included in an AC-DC converter of a forward type and a quasi-resonant type, and further applied to a power supply control IC included in an AC-DC converter of a PSR (Primary Side Regulation) type which controls the output voltage on the secondary side by only the information obtained on the primary side.

According to an aspect of the present invention, there is provided a semiconductor device for switching power supply control including: a high voltage input starting terminal to which a voltage obtained by rectifying an alternating current voltage is input; a discharger which is provided between the high voltage input starting terminal and a ground point; and an input state detection circuit which is connected to the high voltage input starting terminal and detects an input state of the alternating current voltage, wherein the input state detection circuit includes: a voltage divider which includes a high withstand voltage resistor that divides the voltage of the high voltage input starting terminal; a peak hold circuit which includes a capacitor and a discharge switch of the capacitor, and holds a peak voltage of a voltage divided by the voltage divider; a first comparator which compares the voltage divided by the voltage divider with a voltage obtained by proportional reduction of the voltage held by the peak hold circuit, and which detects generation of a plug removal state; a second comparator which compares the voltage divided by the voltage divider with a predetermined voltage, and detects generation of a brownout state; a timer circuit which measures a predetermined time that is set in advance; and a control signal generation circuit which generates a signal to turn on the discharger or a signal to stop outputting of a switching control signal based on an output of the timer circuit, Td1, Td2 and Td3 are set to have a relationship of Td1<Td2<Td3, Td1 being a delay time until the capacitor is discharged after an output of the second comparator is changed in accordance with decrease of an alternating current input, Td2 being a delay time for determining the plug removal state, and Td3 being a delay time for determining the brownout state, and at least the delay time Td2 and the delay time Td3 are measured by a common timer circuit.

According to the above configuration, the delay time Td1 until the capacitor is discharged, the delay time Td2 for determining the plug removal state and the delay time Td3 for determining the brownout state are set in a relationship of Td1<Td2<Td3. Thus, in a case where the brownout detection function and the discharge function of the X capacitor are provided, it is possible to accurately detect the brownout state and the plug removal state by using the high voltage input starting terminal as the detection terminal for both of the functions. Since the timer circuit is shared, it is possible to avoid the increase in chip size and suppress the generation of noise. Furthermore, the voltage divider which is connected to the high voltage input starting terminal can be used as a common means for determining the plug removal state not only for detecting the brownout state. Thus, it is possible to reduce the chip size compared with a case where separate means are provided.

Preferably, the semiconductor device for switching power supply control includes: a clock generation circuit which generates a clock signal of a predetermined period; and a switching control signal generation circuit which generates the switching control signal based on the clock signal from the clock generation circuit, wherein in response to that the delay time Td2 is measured by the timer circuit, the control signal generation circuit generates and outputs a control signal for turning on the discharger, and in response to that the delay time Td3 is measured by the timer circuit, the control signal generation circuit generates a brownout detection signal and supplies the generated brownout detection signal to the switching control signal generation circuit to stop outputting of the switching control signal.

By the above configuration, it is possible to perform the desired control accurately by determining whether the current state is the state in which the AC plug is removed and the discharging of X capacitor is required, or whether the current state is in the low AC input level (brownout) state and requiring stopping of the outputting of switching control signal (GATE) on the basis of the voltage input to the high voltage input starting terminal. Even if the AC plug is removed in the brownout state, it is possible to detect the removal and discharge the X capacitor. Even if the input level is brown-in, in a case where the AC plug is removed at the timing of low input level, it is possible to discharge the X capacitor without detecting the brownout by mistake.

Preferably, in the semiconductor device for switching power supply control, the control signal generation circuit generates a control signal for turning on the discharge switch of the peak hold circuit to discharge the capacitor in response to that the delay time Td1 is measured by the timer circuit.

If the change width in the AC peak voltage is large when the AC input level changes to the brownout from the brown-in (t1 in FIG. 8), the peak hold circuit cannot hold the AC peak value after the change instantly. Thus, depending on conditions, the threshold of plugout detection may exceed the AC peak value after the change, leading to the wrong detection determining that the plug was removed though the AC input merely becomes lower than the predetermined value and the AC input is in the plug-in state. By the above configuration, the electric charges held in the peak hold circuit (capacitor) can be discharged at the time when the timer circuit measures the delay time Td1. Thus, since the threshold of plugout detection is set at an appropriate level (equal to or lower than the AC peak value after change), it is possible to prevent the wrong detection.

Preferably, in the semiconductor device for switching power supply control, the common timer circuit is reset and starts a time measuring operation in response to output change of the first comparator and the second comparator, and resetting of the timer circuit is prohibited even when an output of the first comparator changes, until the second comparator detects start of the brownout state and the delay time Td3 elapses.

By the above configuration, it is possible to appropriately and easily generate a reset signal of the timer circuit. In addition, it is possible to measure the delay time Td2 for determining the plug removal state and the delay time Td3 for determining the brownout state by a common timer circuit since the timer circuit is not reset during detection of the brownout state.

Preferably, in the semiconductor device for switching power supply control, the common timer circuit measures the delay time Td1, the delay time Td2, and the delay time Td3.

By the above configuration, the three delay times can be measured by using a common timer circuit. Thus, it is possible to avoid the increase in chip size by reducing the possession area of the timer circuit, and suppress the generation of noise since there is no simultaneous operation of a plurality of timer circuits having different oscillation frequencies.

In a case where the timer circuit is formed of a frequency division circuit having a plurality of flip-flops in a cascade connection and the delay times Td1, Td2 and Td3 are set to satisfy Td2=2Td1 and Td3=4Td1, for example, the time measuring signal of Td2 is obtained by taking out from a half step of the time measuring signal of Td3, and the time measuring signal of Td1 is obtained by taking out from a quarter step of the time measuring signal of Td3. Thus, it is possible to easily generate each time measuring signal (timeout signal).

Preferably, the semiconductor device for switching power supply control includes: a switch which is connected between the high voltage input starting terminal and a power supply terminal to which a voltage obtained by rectifying an induced voltage in an auxiliary winding wire of a transformer is applied; and a starting control circuit which controls the switch when a voltage is applied to the high voltage input starting terminal, wherein the switch includes a depression type N-channel MOS transistor with a high withstand voltage, and the discharger is connected in series with the switch between the high voltage input starting terminal and the ground point.

By the above configuration, it is not necessary to form the discharger with a high withstand voltage element, the discharger discharging the electric charges of the high voltage input starting terminal when the plug removal state occurs.

According to an aspect of the present invention, in the semiconductor device for control that includes the brownout detection function and the X capacitor discharge function, it is possible to accurately detect the brownout state and the plug removal state by using the high voltage input starting terminal as a detection terminal for detecting both of the states. Since a timer circuit necessary for the brownout detection function and the X capacitor discharge function is shared for both of the functions, there is an advantage that it is possible to reduce the possession area of the timer circuit to avoid the increase in chip size, and suppress the generation of noise.

Although some embodiments of the present invention have been described and illustrated in detail, the disclosed embodiments are made for purposes of not limitation but illustration and example only. The scope of the present invention should be interpreted by terms of the appended claims.

What is claimed is:

1. A semiconductor device for switching power supply control comprising:
    a high voltage input starting terminal to which a voltage obtained by rectifying an alternating current voltage is input;
    a discharger which is provided between the high voltage input starting terminal and a ground point; and
    an input state detection circuit which is connected to the high voltage input starting terminal and detects an input state of the alternating current voltage, wherein
    the input state detection circuit includes:
        a voltage divider which includes a high withstand voltage resistor that divides the voltage of the high voltage input starting terminal;
        a peak hold circuit which includes a capacitor and a discharge switch of the capacitor, and holds a peak voltage of a voltage divided by the voltage divider;
        a first comparator which compares the voltage divided by the voltage divider with a voltage obtained by proportional reduction of the voltage held by the peak hold circuit, and which detects generation of a plug removal state;
        a second comparator which compares the voltage divided by the voltage divider with a predetermined voltage, and detects generation of a brownout state;
        a timer circuit which measures a predetermined time that is set in advance; and
        a control signal generation circuit which generates a signal to turn on the discharger or a signal to stop outputting of a switching control signal based on an output of the timer circuit,
    Td1, Td2 and Td3 are set to have a relationship of Td1<Td2<Td3, Td1 being a delay time until the capacitor is discharged after an output of the second comparator is changed in accordance with decrease of an alternating current input, Td2 being a delay time for determining the plug removal state, and Td3 being a delay time for determining the brownout state, and
    at least the delay time Td2 and the delay time Td3 are measured by a common timer circuit.

2. The semiconductor device for switching power supply control according to claim 1, comprising:
    a clock generation circuit which generates a clock signal of a predetermined period; and
    a switching control signal generation circuit which generates the switching control signal based on the clock signal from the clock generation circuit, wherein
    in response to that the delay time Td2 is measured by the timer circuit, the control signal generation circuit generates and outputs a control signal for turning on the discharger, and
    in response to that the delay time Td3 is measured by the timer circuit, the control signal generation circuit generates a brownout detection signal and supplies the generated brownout detection signal to the switching control signal generation circuit to stop outputting of the switching control signal.

3. The semiconductor device for switching power supply control according to claim 1, wherein the control signal generation circuit generates a control signal for turning on the discharge switch of the peak hold circuit to discharge the capacitor in response to that the delay time Td1 is measured by the timer circuit.

4. The semiconductor device for switching power supply control according to claim 1, wherein
    the common timer circuit is reset and starts a time measuring operation in response to output change of the first comparator and the second comparator, and
    resetting of the timer circuit is prohibited even when an output of the first comparator changes, until the second comparator detects start of the brownout state and the delay time Td3 elapses.

5. The semiconductor device for switching power supply control according to claim 1, wherein the common timer circuit measures the delay time Td1, the delay time Td2, and the delay time Td3.

6. The semiconductor device for switching power supply control according to claim 1, comprising:
    a switch which is connected between the high voltage input starting terminal and a power supply terminal to which a voltage obtained by rectifying an induced voltage in an auxiliary winding wire of a transformer is applied; and a starting control circuit which controls the switch when a voltage is applied to the high voltage input starting terminal, wherein the switch includes a depression type N-channel MOS transistor with a high withstand voltage, and the discharger is connected in series with the switch between the high voltage input starting terminal and the ground point.

7. An AC-DC converter comprising:

the semiconductor device for switching power supply control according to claim 1;

a transformer which includes an auxiliary winding wire and in which a voltage obtained by rectifying an alternating current voltage is applied to a primary-side winding wire; and a switching element which is connected to the primary-side winding wire, wherein the switching element is controlled by using the semiconductor device for switching power supply control.

* * * * *